(No Model.) 3 Sheets—Sheet 1.
R. EICKEMEYER.
DYNAMO ELECTRIC MACHINE OR ELECTRIC MOTOR.
No. 351,906. Patented Nov. 2, 1886.
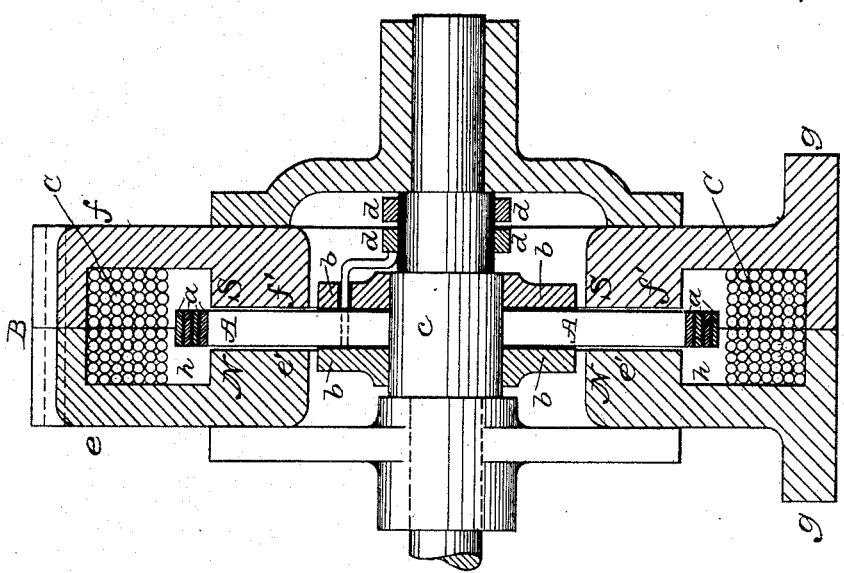
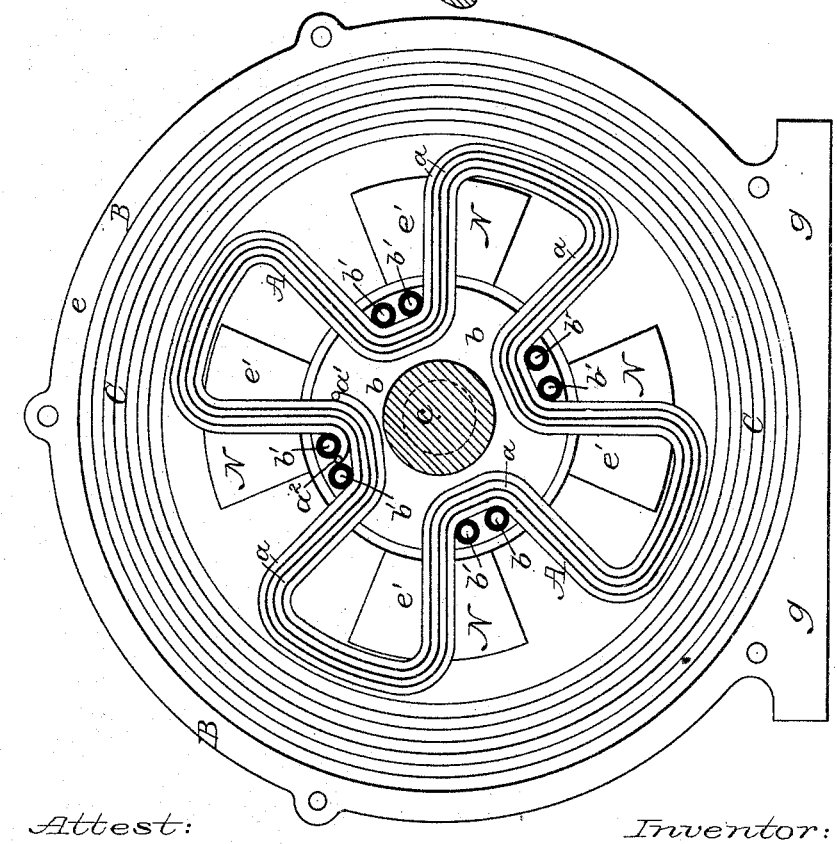
Attest:
Philip F. Larner.
Howell Battle
Inventor:
Rudolf Eickemeyer,
By Wm C. Knox
Attorney.

(No Model.) 3 Sheets—Sheet 2.
R. EICKEMEYER.
DYNAMO ELECTRIC MACHINE OR ELECTRIC MOTOR.
No. 351,906. Patented Nov. 2, 1886.
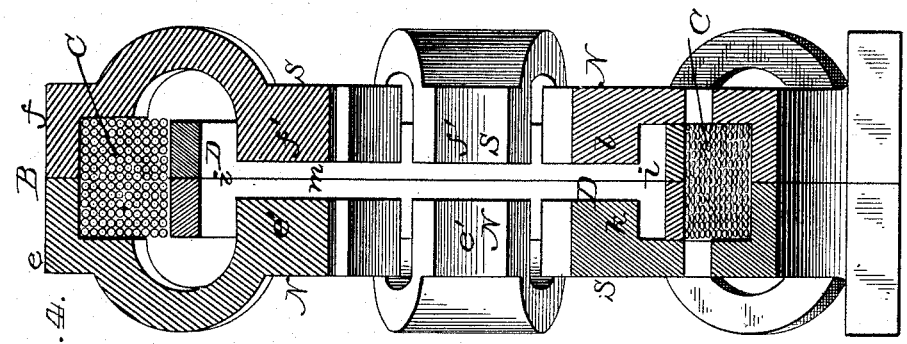
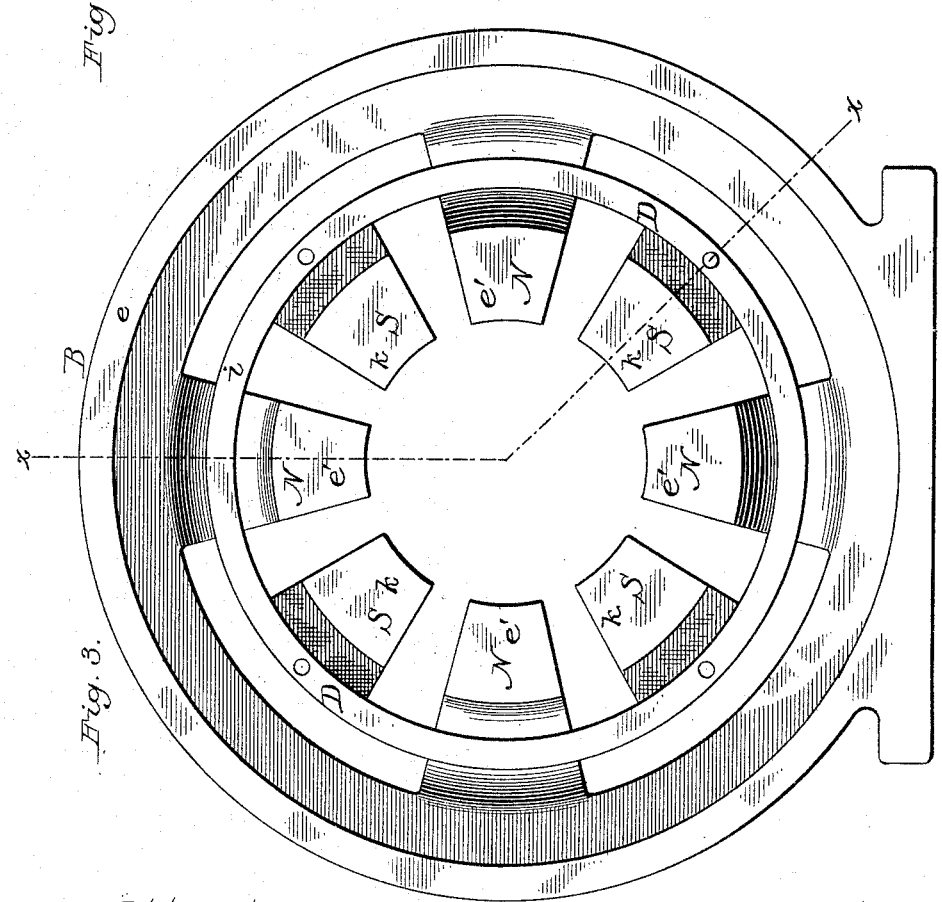
Attest:
Philip F. Larner
Howell T. Bartle
Inventor:
Rudolf Eickemeyer,
By Wm C Mord
Attorney.
N. PETERS, Photo-Lithographer, Washington, D. C.

(No Model.) 3 Sheets—Sheet 3.
R. EICKEMEYER.
DYNAMO ELECTRIC MACHINE OR ELECTRIC MOTOR.
No. 351,906. Patented Nov. 2, 1886.
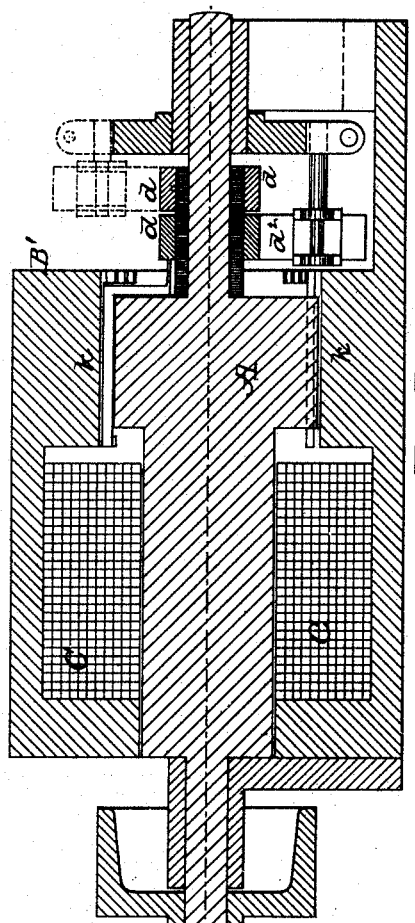
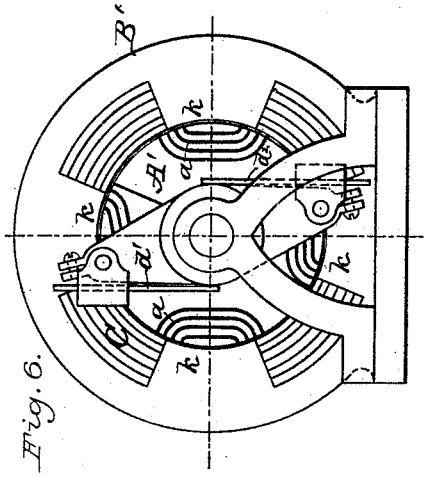
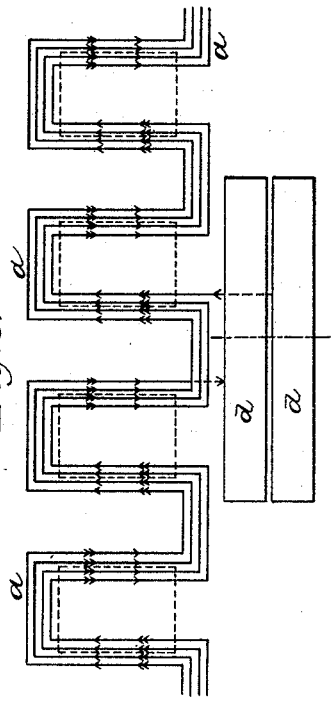
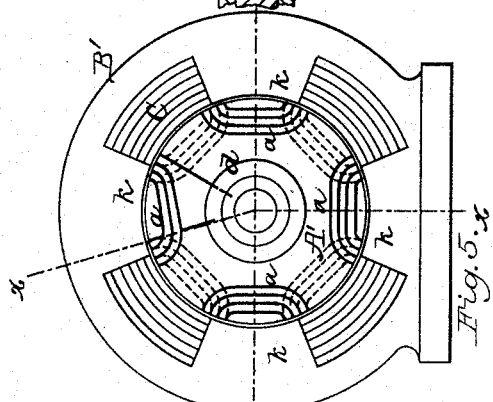
Attest:
Philip F. Larner.
Nowell Bartle.
Inventor:
Rudolf Eickemeyer,
By Wm C Wood
Attorney.

UNITED STATES PATENT OFFICE.

RUDOLF EICKEMEYER, OF YONKERS, NEW YORK.

DYNAMO-ELECTRIC MACHINE OR ELECTRIC MOTOR.

SPECIFICATION forming part of Letters Patent No. 351,906, dated November 2, 1886.

Application filed November 5, 1885. Serial No. 181,975. (No model.)

*To all whom it may concern:*

Be it known that I, RUDOLF EICKEMEYER, of Yonkers, in the county of Westchester and State of New York, have invented certain new and useful Improvements in Dynamo-Electric Machines or Electric Generators or Motors; and I do hereby declare that the following specification, taken in connection with the drawings furnished and forming a part of the same, is a clear, true, and complete description of my invention.

In my application for Letters Patent filed November 8, 1882, Serial No. 76,234, and March 2, 1885, Serial No. 157,545, I have shown, described, and claimed certain improvements as devised by me and applied to so-called "unipolar," and also to bipolar, machines; but my present application relates exclusively to that class of machines known as "multipolar."

The gist of my said improvements, so far as it relates to these three general types of machines, consists in an exciting-helix which is housed within a magnetic shell and is concentric with the axis of the armature; and in my prior machines I have employed armatures of widely-varied construction.

In multipolar machines as heretofore constructed the armatures have been variously constructed, but in their best form are composed, mainly, of wires, ribbons, or strips of metal in considerable lengths, bent into what has been expressively termed a "zigzag" form, and secured to a central hub or axis, to which power is applied when operating as an electric generator. Heretofore in multipolar machines the several pole-faces have been circularly arranged in two oppositely-located series, and each magnet-core has either had its own exciting-helix, or an insulated wire has been continuously wound in a repeated zigzag course around all of the cores of each series of magnets.

Broadly stated, a multipolar machine embodying the main feature of my present invention contains an armature having a zigzag conductor, a shell having an annular series of cheeks or pole-faces, and an exciting-helix which polarizes all of said cheeks. In one form of these machines devised by me there is an annular series of cheek-pieces arranged to afford a cylindrical chamber for the reception of a drum-shaped armature carrying a zigzag conductor, and the helix imparts to all of the cheeks the same polarity and to the body of the armature an opposite polarity. In another form of these machines I employ an annular magnetic shell having two oppositely-located annular series of cheeks or pole-faces, which are oppositely polarized by an exciting-helix constructed in one or more parts. In such a machine the space between the two sets of cheeks or pole-faces is occupied by the armature, and the exciting-helix surrounds the armature peripherally. In one of its simplest forms a machine embodying this feature contains an annular magnetic shell affording opposite poles, divided so as to form an annular series of cheeks or pole-faces, and an exciting-helix inclosed within said shell and peripherally surrounding the space occupied by the armature. In another and simpler form of machine an annular magnetic shell having cheeks or pole-faces, as last described, is itself surrounded peripherally by the exciting-helix, the armature being within said shell, and also peripherally surrounded by said helix. In some of these forms of machine the cheeks or pole-faces on each side of the shell are of corresponding polarity, those on one side being N and on the other side S; but with the shell wherein the helix is housed the N poles would be on the opposite side of the machine from that on which they would be in a machine having a shell with the same or like helix surrounding it peripherally, and therefore, by combining two such magnetic shells in one machine and employing a helix common to both shells, I am enabled to have cheeks or pole-faces on each side of the machine, which alternate as to polarity.

To more particularly describe my invention, I will refer to the accompanying three sheets of drawings, in which—

Figure 1 is a central vertical section of one of my multipolar machines on a line at right angles to the axis of its armature. Fig. 2 is a central section of the same in line with said axis. Fig. 3 illustrates one half of a complex magnetic shell as in one of my machines in its best form, the exciting-helix and the armature being omitted. Fig. 4 illustrates said shell in section on line $x$, with the exciting-helix in position, the armature being omitted. Figs. 5 and 6 illustrate in end view, and respectively without and with end framing and brushes, another form of novel machine embodying my invention. Fig. 7 is a longitudinal section of the same on line $x$, Fig. 5. Fig. 8 illustrates the zigzag conductor of this machine in plane projection, and also the conducting-rings with which the terminals of said conductor are coupled.

It is to be distinctly understood that my present invention is in no manner dependent upon an armature of any particular construction, provided it be adapted for use in a multipolar machine.

As shown in Figs. 1 and 2, the armature A is composed of a metal strip or band, $a$, of good conducting capacity, usually of copper, carefully insulated and bent in zigzag lines, so as to form four continuous loops or connected arms. Said arms are clamped at their inner ends between flanges $b$, and securely mounted on an axis or shaft, $c$, having suitable bearings, and also the usual belt-pulley or other means by which power is either communicated to or imparted from the machine, according to whether it is operated as an electric generator or a motor. The terminals $a'$ and $a^2$ of the armature-conductor $a$ are coupled to the conducting-rings $d$ on the shaft $c$, and with said rings outside conductors are connected by means of suitable brushes or equivalent devices. The bolts $b'$, by which the flanges $b$ are clamped, are insulated from said flanges, which may in turn be insulated from the shaft, and the latter may, with good results, have its bearings composed of non-magnetic metal, if they are mounted on the magnetic shell B of the machine. The shell B is annular in form, and is preferably constructed in two dish-shaped counterparts, $e$ and $f$, and provided with a foot, $g$, and bolts, by which the parts are clamped together, thus enabling the shell to serve as the frame of the machine. Each of the counterparts is internally chambered to afford an annular recess, $h$, within which the exciting-helix C is housed, and this latter may be constructed in two or more parts or sections, so that any two or more may be coupled and others of the sections left out of circuit, as occasion may require; but in however many parts said helix may be made it will be substantially one exciting-helix, which will develop magnetic poles at the inner or central portion of each of the shell counterparts.

As shown in Figs. 1 and 2, four annularly-arranged cheeks or pole-faces, $e'$, are formed on the part $e$ of the shell, the latter having inwardly-projecting cheeks, all of which, for instance, are polarized N, and on the part $f$ are four similar cheeks or pole-faces, $f'$, all polarized S. Between these two annular sets or series of pole-faces is a space, within which the zigzag armature A is freely rotated, and if operated as a generator an alternating electric current is induced. One half of each loop of the armature recedes from one pair of cheeks, while the other half approaches the next pair during one-eighth of each revolution, and therefore an electric current is induced in the armature in one direction, and a similar current in the opposite direction is then induced during the next eighth of a revolution, and these alternate currents, on being taken from the conducting-rings, may be converted into currents in one direction by the use of a commutator in the usual manner.

In Figs. 3 and 4 I show how, instead of having all the cheeks or pole-faces on one side of the machine of one polarity, they are alternated N S throughout the series, and each has on the opposite side of the machine a cheek or pole-face of an opposite polarity. In this machine there is an outer or main shell, B, composed of counterparts $e$ and $f$, as before described, except that the shell on each side, between the cheek-pieces or pole-faces $e'e'$ and $f''f''$, is cut away, so that the said cheek-pieces are in the form of radial lugs, integral with the periphery of their respective parts of the shell. Within the main shell is an inner auxiliary shell, D, which includes a ring, $i$, composed of magnetic metal and constructed in two parts, snugly fitting the interior of the helix C, and a series of iron cheek-pieces, $k$ and $l$, which are bolted in pairs to the edges of said ring, and project inwardly toward the center. As here shown, the main shell and the auxiliary shell have each four pairs of cheeks or pole-faces, and these alternate, so that between each pair of main-shell pole-faces $e'f''$ there is a pair of auxiliary-shell pole-faces, $k$ $l$, and with the helix C inclosed in the outer shell and surrounding the inner shell, the cheeks $e'$ and $l$ are polarized N and the cheeks $f'$ and $k$ are polarized S, and therefore the pole-faces on each side of the machine are alternately polarized N S throughout the series. The space $m$ between the two double series of pole-faces is occupied by any suitable armature, as before indicated, and its rotation will afford the same as or better results than the machine first described. It will be obvious, if the outer or main shell were removed or if it were constructed of non-magnetic metal, that the auxiliary shell would be polarized in the same manner by the exciting-helix as when the outer shell was also polarized. To reduce magnetic resistance the spaces between the loops or arms of the armature may be filled with plates of soft iron; but, owing to the incident rapid intermitting reversals in polarity, the iron is so liable to be unduly heated that I prefer to dispense with such iron plates.

As multipolar armatures are largely varied in their form and construction, it follows that the casings or shells must be correspondingly varied in their construction and arrangement, so as to afford suitable cheeks and proper space for the reception of an armature in each case, and I do not therefore limit myself to any precise construction and arrangement of the shell or shells and the helix.

In this connection it is to be understood that the layers of the zigzag conductor need not always overlie each other, as shown in Figs. 1 and 2, nor must the series of cheek-pieces always have faces at right angles to the axis of the armature, nor always alternate in polarity in order to place them within certain portions of my invention—as, for instance, in the machine illustrated by me in Figs. 5 to 8, inclusive, the armature A' embodies a magnetic core having axial bearings at each end, and has a pulley at one end and a pair of conducting-rings, $d\ d$, at the other, and said armature is located within a shell, B', and also within the exciting-helix C, which is in turn inclosed by said shell. This armature is of the drum form, as distinguished from the disk form previously described, and hence the shell B' has an annular series of cheek-pieces, $k$, with their faces arranged circularly, to afford a cylindrical chamber in which is located that portion of the armature which carries the zigzag conductor $a$. In this machine four of these cheeks are employed, as clearly illustrated in Figs. 5 and 6, and the zigzag conductor $a$, as illustrated in Fig. 8, is laid upon and secured to the peripheral surface of the head of the armature, and its convolutions are side by side, so as to encircle the armature in its zigzag course four times, each terminal being coupled to its proper conducting-ring, $d$, with which the brushes $d'$ and $d^2$ are in contact in a manner well known. In this form of machine the helix is not technically concentric with the annular series of cheeks, but it is so located with reference thereto as to polarize all of them, and the said helix is not concentric with the entire armature; but it is so far concentric with a portion thereof as to impart one polarity to that portion which carries the zigzag conductor and an opposite polarity to all of the cheeks.

Having thus described my invention, I claim as new and desire to secure by Letters Patent—

1. The combination, substantially as hereinbefore described, of an armature embodying a zigzag conductor, an inclosing-shell having an annular series of cheeks or pole-faces, and an exciting-helix which polarizes all of said cheeks.

2. The combination, substantially as hereinbefore described, of a magnetic shell having a series of oppositely-located cheeks or pole-faces and an exciting-helix concentric with and polarizing all of said cheeks.

3. The combination, substantially as hereinbefore described, of a magnetic shell having a series of oppositely-located cheeks or pole-faces and an exciting-helix concentric with said pole-faces and housed within said shell.

4. The combination, substantially as hereinbefore described, of a main outer magnetic shell, an auxiliary inner shell, each provided with a series of oppositely-located cheeks or pole-faces, and an exciting-helix concentric with said cheeks within said main shell and peripherally surrounding the auxiliary shell.

5. The combination, substantially as hereinbefore described, of a magnetic shell having an annular series of oppositely-located cheeks or pole-faces, an armature embodying loops or arms composed of a continuous length of conducting metal, and an exciting-helix concentric with said armature and polarizing said cheeks or pole-faces.

RUDOLF EICKEMEYER.

Witnesses:
HENRY OSTERHELD,
R. EICKEMEYER, Jr.